US009030503B2

(12) United States Patent
Moore

(10) Patent No.: US 9,030,503 B2
(45) Date of Patent: May 12, 2015

(54) ANAMORPHIC EYEPIECE WITH A MICROLENS ARRAY FOR A PANORAMIC FIELD OF VIEW

(75) Inventor: Sean A. Moore, Alexandria, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 1151 days.

(21) Appl. No.: 13/008,194

(22) Filed: Jan. 18, 2011

(65) Prior Publication Data

US 2012/0182326 A1   Jul. 19, 2012

(51) Int. Cl.
G09G 5/10 (2006.01)
G02B 27/01 (2006.01)
G09G 3/20 (2006.01)

(52) U.S. Cl.
CPC .... *G02B 27/0172* (2013.01); *G02B 2027/0123* (2013.01); *G09G 3/2074* (2013.01); *G09G 2300/0443* (2013.01); *G09G 2340/0457* (2013.01)

(58) Field of Classification Search
CPC .......... G02B 27/0172; G02B 27/0081
USPC ............. 345/1.1, 690; 349/645; 359/619
See application file for complete search history.

(56) References Cited

U.S. PATENT DOCUMENTS

| 7,274,383 | B1* | 9/2007 | Brown Elliot | 345/694 |
| 2004/0021851 | A1* | 2/2004 | Namiki | 356/125 |
| 2004/0173737 | A1* | 9/2004 | Shimomura et al. | 250/231.13 |
| 2007/0035706 | A1* | 2/2007 | Margulis | 353/122 |
| 2007/0177275 | A1* | 8/2007 | McGuire, Jr. | 359/630 |
| 2008/0055189 | A1* | 3/2008 | Wilk et al. | 345/1.3 |
| 2010/0133424 | A1* | 6/2010 | Lindsay | 250/237 R |

OTHER PUBLICATIONS

Schott AG, Schott Glass table Aug. 9, 2005, school of physics http://www2.ph.ed.ac.uk/~wjh/teaching/optics/glass/schott/SchottGlassList.pdf.*
Moore, "Anamorphic Eyepiece for Increased Field of View," Optical Society of America IODC 2010 Technical Digest Jun. 2010.
http://www.liv.ac.uk/aerospace/PROJECTS/PERIPHERAL_VISION/index.htm.
National Research Council, Tactical Display for Soldiers: Human Factors Considerations, Ch. 3, National Academy Press, Washington, D.C., 1997.
The Photonics Dictionary2005, p. D-140, Laurin Publishing, Pittsfield, MA, 2005.

* cited by examiner

*Primary Examiner* — Quan-Zhen Wang
*Assistant Examiner* — Calvin C Ma
(74) *Attorney, Agent, or Firm* — Richard J. Kim

(57) ABSTRACT

An innovative anamorphic eyepiece is described, which uses a microlens array with complex surface features used in conjunction with a modified microdisplay to provide a high resolution image with a panoramic field of view. An optical system can be based on such an eyepiece with a microlens array and modified microdisplay that can provide a large, panoramic field of view to the user. The microdisplay is modified to increase the resolution in the horizontal axis.

13 Claims, 3 Drawing Sheets

|  | Y-Axis | X-Axis |
|---|---|---|
| EFL | 26.19 mm | 15.17 mm |
| FOV | 26.41 degrees | 53.70 degrees |
| IFOV | 0.026 degree | 0.028 degree |
| Nyquist Frequency (lp/mm) | 42 | 63 |
| Nyquist Frequency (cy/mrad) | 1.09 | 0.95 |

ANAMORPHIC EYEPIECE WITH A MICROLENS ARRAY FOR A PANORAMIC FIELD OF VIEW

GOVERNMENT INTEREST

The invention described herein may be manufactured, used, sold, imported, and/or licensed by or for the Government of the United States of America.

FIELD OF THE INVENTION

This invention relates in general to optics, and more particularly, to an anamorphic eyepiece based on a microlens array.

BACKGROUND OF THE INVENTION

Head-mounted displays (HMDS) currently play an important role in many professions, such as those of aviators and soldiers, and the future will see their use further expanded into additional industries and applications.

A drawback to most of the currently developed head-mounted systems is their limited field of view. In applications where they are used to aid mobility, as is the case for night vision devices or aviation aids, the reduced field of view obstructs visual cues in the periphery such as those that are used for walking. Situational awareness is also compromised when compared to normal visual ability in more typical scenarios. The operator will be unable to see any movements or objects that are outside of the field of view. This can prove deadly for military users in an area of active conflict.

SUMMARY OF THE INVENTION

An optical system is disclosed, comprising an eyepiece with a microlens array and modified microdisplay that can provide a large, panoramic field of view to the user. The microdisplay is modified to increase the resolution in the horizontal axis by using subpixels as individual pixels, thereby tripling the number of pixels in the horizontal axis. Alternately, the electronics can be set so that two of the subpixels have the same output and can be treated as one. This modified microdisplay is couple with an eyepiece having a different focal length in the horizontal axis than it has in the vertical axis. This will provide the same instantaneous field of view in each direction for the new pixel dimensions. The eyepiece can be made with a telecentric eyepiece lens and a microlens array with anamorphic lenslets placed near the display.

In another aspect, an optical system is disclosed, comprising a telecentric eyepiece; a microlens array with anamorphic lenslets; and a microdisplay capable of displaying a panoramic field of view, wherein said microdisplay is modified to have a focal length in its horizontal axis different from the focal length in its vertical axis, and wherein said horizontal and vertical axes of the pixels have equal instantaneous fields of view.

Yet, in another aspect, an anamorphic eyepiece arrangement for a panoramic field of view is disclosed, comprising an eyepiece configured to be telecentric based on a first lens having a spherical first surface and an aspheric second surface; a second lens having an aspheric first surface and a spherical second surface; and a third lens being a doublet having spherical surfaces. The telecentric eyepiece has an aperture stop, which is also the eye pupil of said eyepiece.

BRIEF DESCRIPTION OF THE DRAWINGS

Additional advantages and features will become apparent as the subject invention becomes better understood by reference to the following detailed description when considered in conjunction with the accompanying drawings wherein:

FIG. 2 shows a table listing exemplary final characteristics of an exemplary eyepiece.

DETAILED DESCRIPTION

Figure 1:
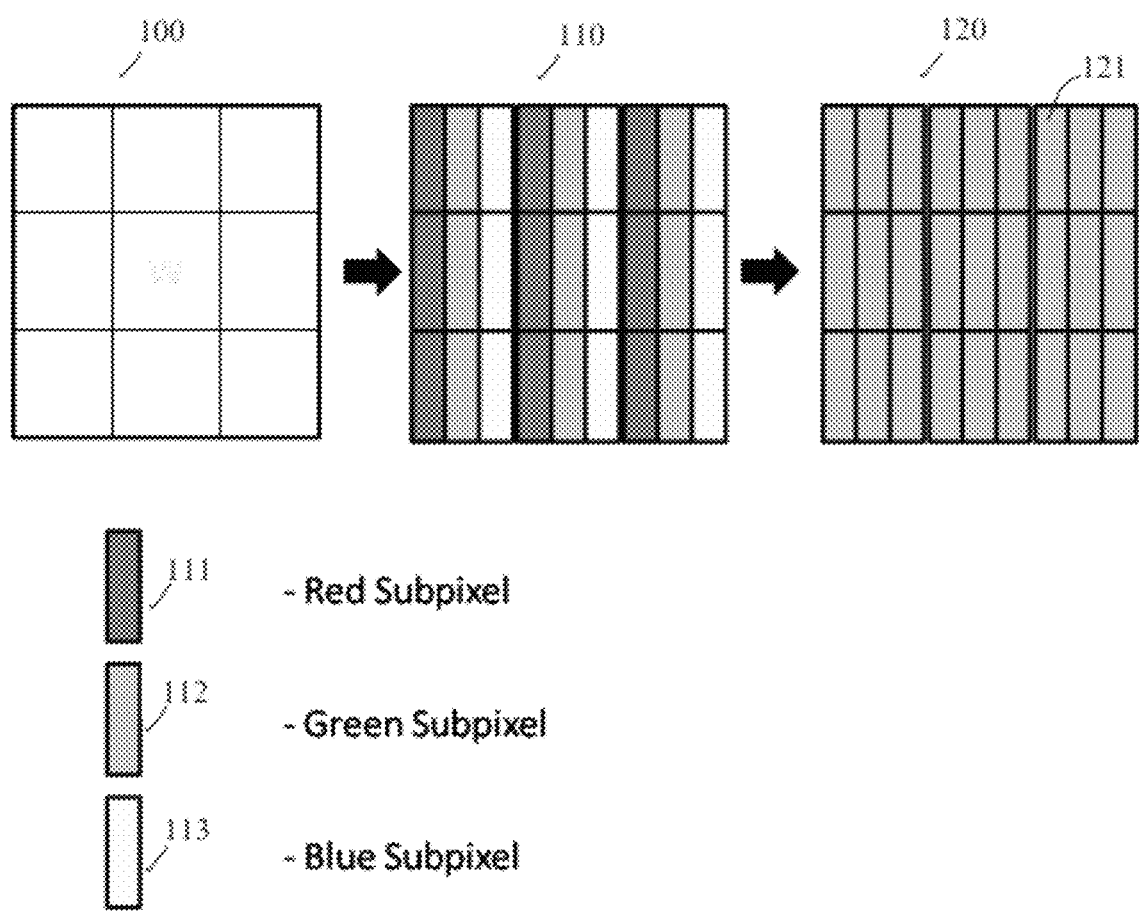
FIG. 1 shows an exemplary diagram of an exemplary microdisplay configuration.

An exemplary optical system (e.g., 300) is disclosed, comprising an eyepiece (e.g., 310) with a microlens array 2 and modified microdisplay 1 that can provide a large, panoramic field of view to the user. The microdisplay 1 can be modified to increase the resolution in the horizontal axis by using subpixels as individual pixels, thereby tripling the number of pixels in the horizontal axis. Alternately, the electronics can be set so that two of the subpixels have the same output and can be treated as one. This modified microdisplay (e.g., 1) can be couple with an eyepiece (e.g., 310) having a different focal length in the horizontal axis than it has in the vertical axis. This will provide the same instantaneous field of view in each direction for the new pixel dimensions. The eyepiece can be made with a telecentric eyepiece lens and a microlens array with anamorphic lenslets placed near the display.

Such an exemplary optical system (e.g., 300) comprising an eyepiece (e.g., 310) with a microlens array 2 and modified microdisplay 1 can provide a large, panoramic field of view to the user.

One exemplary approach involves making a color (e.g., 100) microdisplay monochromatic 120 and driving each of the red 111, green 112, and blue 113 subpixels 121 as individual pixels, thereby tripling the number of pixels in the horizontal axis. Alternately, the electronics can be set so that two of the subpixels (e.g., 121) have the same output and can be treated as one. Assuming the horizontal and vertical axes of the pixels have equal instantaneous fields of view, a standard 1280×1024 microdisplay 100) can provide a panoramic display (e.g., 120) with a 3840×1024 or 1920×1024 resolution, depending on whether the subpixels (e.g., 121) are driven individually or two at a time.

This increase in horizontal resolution can be leveraged to provide a panoramic field of view to the user by utilizing an anamorphic eyepiece (e.g., 310) having a different focal length in the horizontal axis than it has in the vertical axis. The pixel aspect ratio has been altered to a 1:3 or 2:3 ratio. The different focal lengths in each axis can be configured to provide the same instantaneous field of view in each direction for the new pixel dimensions.

An exemplary embodiment of display chosen for this effort is a 1280×1024 microdisplay with a 12 micrometer pixel pitch. The color filter has been stripped off the display (e.g. 110) making it monochrome (e.g., 120) and exposing each of the RGB sub-pixels (e.g., 111-113). The sub-pixels (e.g., 121) are all made the same color (green). This is illustrated in FIG. 1. The electronics can drive the sub-pixels (e.g., 121) so that they are doubled up, giving two of the sub-pixels the same output. This essentially produces a pixel aspect ratio of 2:3, or 8 micrometers in the horizontal by 12 micrometers in the vertical. In order for us to maintain the same instantaneous field of view in both axes, an anamorphic eyepiece can be configured that has an effective focal length ratio of 2:3 in the horizontal and vertical axes. The various exemplary alternative specifications for the final eyepiece configuration are listed in the table in FIG. 2.

Figure 3:
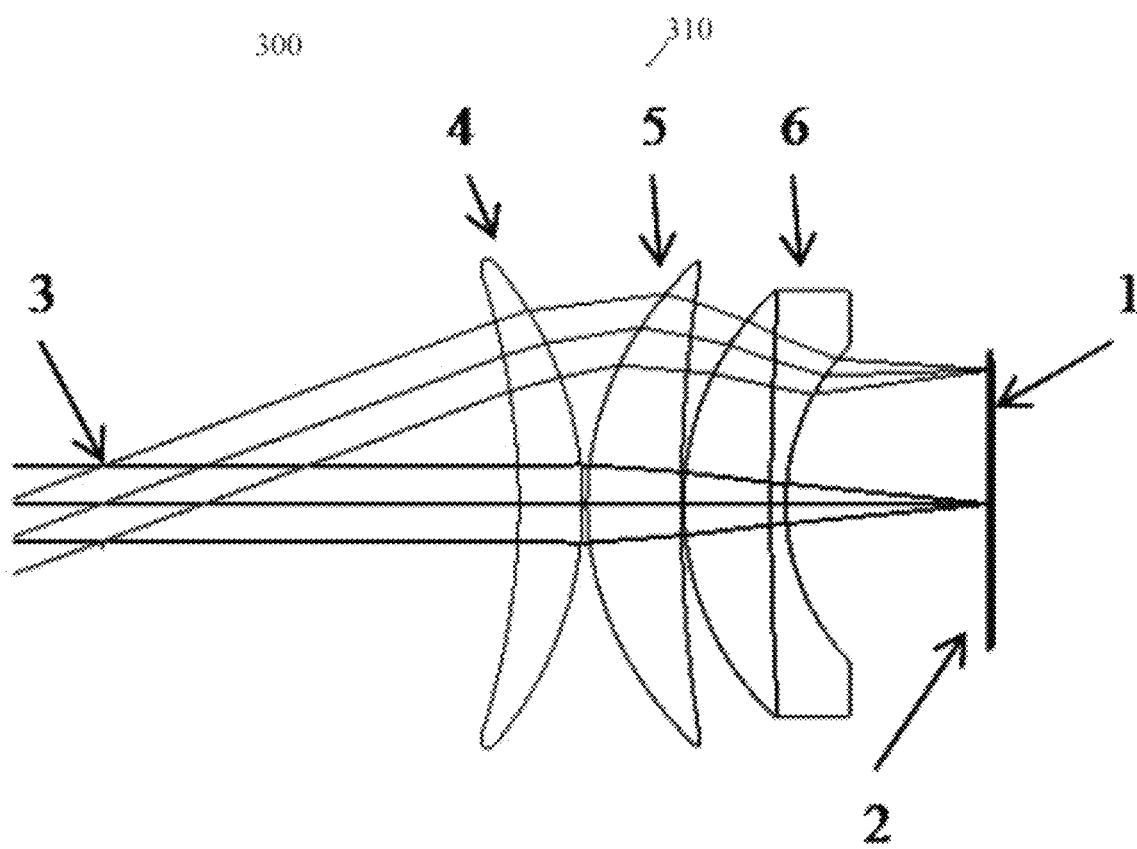
FIG. 3 shows a layout of an exemplary eyepiece configured with an exemplary microlens array.

FIG. 3 shows a layout of the eyepiece. The previously described microdisplay (1) has a microlens array (2) placed in lieu of the display's cover glass. This array is comprised of microlenses that are on the same scale as the display pixels. They can have a powered surface on both sides, which are carefully aligned to within a micrometer. The surfaces of the lenslets are anamorphic, that is they have a different focal length in the horizontal and vertical directions. This particular array 2 can have microlenses that have a focal length of 55.5 millimeters in the vertical direction and 0.2 mm in horizontal direction.

As a result, the effective focal length of the eyepiece as a whole is altered so that the horizontal and vertical directions have different focal lengths. In this case the altered focal length ratio for the eyepiece is 2:3 in the horizontal to the vertical, as shown in FIG. 2. This gives the pixels equal instantaneous fields of view in both directions. This has the effect of making the rectangular pixels appear square. Without the microlens array (e.g., 2), the pixels would continue to appear rectangular, and the image would appear thinner, or flattened in the horizontal direction. The array also includes markings outside of the area actively used for imaging in order to facilitate alignment with the microdisplay (e.g., 1).

An anamorphic eyepiece arrangement for a panoramic field of view (e.g., 310), as described from the eye pupil (3) to the display (e.g., 1), is comprised of three elements (e.g., 4, 5, 6). All three are made from schott glasses. The first lens (4) is a NLAK33 lens with the first surface being spherical and the second aspheric. The second (5) is a NLAK14 lens with an aspheric first surface and a spherical second surface. The third lens (6) is a doublet, with all spherical surfaces, made with NFK5 and SFL57. It is important that the eyepiece is designed to be telecentric. A telecentric lens has the aperture stop, which is also the eye pupil in the case of eyepieces, located at the front focus of the lens. This results in the chief rays being parallel to the optical axis in image space. Steep chief ray angles will lead to microlenses influencing the output of pixels other than those they are designed to affect. A telecentric lens minimizes this undesirable impact.

It is obvious that many modifications and variations of the present invention are possible in light of the above teachings. It is therefore to be understood that within the scope of the appended claims, the invention may be practiced otherwise than as described.

What is claimed is:

1. An optical system capable of a panoramic field of view, comprising:
    a telecentric eyepiece;
    a microlens array with anamorphic lenslets, wherein a focal length in a horizontal axis is made different from a focal length in a vertical axis; and
    a microdisplay capable of displaying a panoramic field of view, wherein said microdisplay is modified by removing a color filter from its pixels and subpixels for monochromatic imaging, and driving the resulting subpixels as monochromatic pixels to produce an aspect ratio up to 1:3, said microlens array being aligned such that each anamorphic lenslet is disposed in correspondence with a respective monochromatic pixel, and wherein horizontal and vertical axes of the pixels have equal instantaneous fields of view, whereby rectangular pixels are made to appear square.

2. The optical system according to claim 1, wherein said driving the resulting subpixels as monochromatic pixels increases the resolution in its horizontal axis by using subpixels as individual pixels.

3. The optical system according to claim 1, comprising electronics driving said microdisplay such that subpixels are paired to yield a common output as a pixel.

4. The optical system according to claim 1, wherein said microdisplay is a color microdisplay modified as a monochromatic microdisplay, and wherein each color subpixel is driven as individual monochromatic pixel.

5. The optical system according to claim 1, comprising electronics for said microdisplay configured to drive each subpixel individually.

6. The optical system according to claim 1, wherein said microdisplay is based on a standard 1280×1024 microdisplay modified to provide a panoramic display with either a 3840× 1024 or a 1920×1024 resolution, depending on whether the subpixels are driven individually or in pairs.

7. An anamorphic optical system based on a telecentric eyepiece arrangement for a panoramic field of view, comprising:
    an eyepiece configured to be telecentric based on
        a first lens having a spherical first surface and an aspheric second surface,
        a second lens having an aspheric first surface and a spherical second surface, and
        a third lens being a doublet having spherical surfaces,
    wherein said telecentric eyepiece has an aperture stop, which is also the eye pupil of said eyepiece; and
    a microdisplay modified with a microlens array, wherein the microlenses of said microlens array have a horizontal focal length different from a vertical focal length, pixels of the modified microdisplay having a common instantaneous field of view in the horizontal and vertical directions to make rectangular pixels appear square.

8. The anamorphic optical system based on a telecentric eyepiece arrangement according to claim 7, wherein chief rays are made parallel to the optical axis in an image space.

9. The anamorphic optical system based on a telecentric eyepiece arrangement according to claim 7, wherein said first lens is based on a NLAK33 lens; the second lens is based on a NLAK14 lens; and the third lens is based on NFK5 and SFL57.

10. The anamorphic optical system based on a telecentric eyepiece arrangement according to claim 7, wherein said first, second and third lenses are formed of schott glass.

11. The anamorphic optical system based on a telecentric eyepiece arrangement according to claim 7, wherein an effective focal length of the eyepiece arrangement have a focal length in a horizontal direction different from a focal length a vertical direction, wherein the altered focal length ratio for the eyepiece arrangement is 2:3 in the horizontal to the vertical.

12. The anamorphic optical system based on a telecentric eyepiece arrangement according to claim 7, wherein the microlens array includes markings outside of an area actively used for imaging to facilitate alignment with the microdisplay.

13. An optical system having an altered focal length ratio of about 2:3, comprising:
    a telecentric eyepiece;
    a microlens array with anamorphic microlenses, wherein the anamorphic microlenses have a focal length of 55.5 millimeters in a vertical direction and 0.2 mm in a horizontal direction; and a microdisplay capable of displaying a panoramic field of view, wherein said microdisplay is modified to have monochromatic subpixels driven in pairs as monochromatic pixels to produce an aspect ratio of about 2:3, said anamorphic microlenses being aligned with the microdisplay pixels, and wherein horizontal and vertical axes of the pixels have equal instantaneous fields of view, whereby rectangular pixels are made to appear square.

* * * * *